Figure 1:
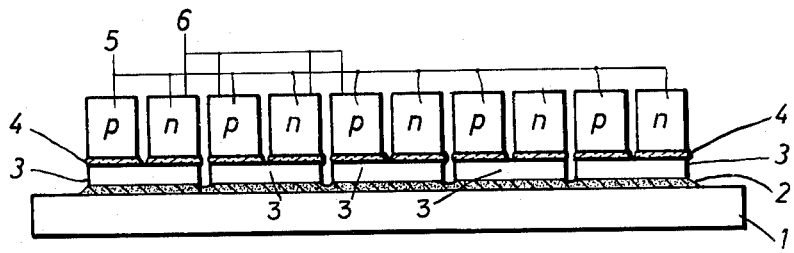

July 19, 1966     A. GROTEN     3,261,713

METHOD OF COATING SURFACE WITH SOLDER

Filed Jan. 11, 1963

INVENTOR.
ARNOLD GROTON
BY
AGENT

United States Patent Office 3,261,713
Patented July 19, 1966

3,261,713
METHOD OF COATING SURFACE WITH SOLDER
Arnold Groten, Aachen, Germany, assignor to North American Philips Company, Inc., New York, N.Y., a corporation of Delaware
Filed Jan. 11, 1963, Ser. No. 250,808
Claims priority, application Germany, Mar. 3, 1962, P 28,897
4 Claims. (Cl. 117—212)

The invention relates to a method of coating surfaces of bodies, particularly bodies of semi-conductor material, with solder, the surfaces consisting of surface portions which are separated by gaps which are filled with a substance which cannot be wetted by the solder. The term "substance" as used herein includes the presence of gases, for example, air, or a vacuum.

In joining several parts by soldering it is known to coat the surfaces to be soldered, for example, by immersing them in a bath of liquid solder. This known method has a limitation in that, unless masks or covers are provided, the solder penetrates between the bodies to be soldered into the gaps which, for example, for reasons of electrical insulation have to remain free from solder. The alternative method of coating each body separately with solder is laborious and takes much time.

In a method of coating surfaces of bodies, particularly bodies of a semi-conductor material with tin solder, in which the surfaces are made up of portions separated by gaps which are filled with a material which cannot be wetted by the solder, the said difficulties are avoided in that according to the invention the surface portions and the gaps are covered with a foil of solder which is provided with apertures so that at least at the areas at which the foil lies on a gap at least one aperture is provided, the apertures being arranged so that the coherence of the foil is maintained before the soldering operation. The apertures may correspond to the form of the gaps or they may be smaller or larger than the gaps.

The invention is based on the recognition of the fact that due to the surface tension the solder when molten withdraws, starting from the apertures, to the surfaces which are coated with solder and can be wetted thereby.

The method in accordance with the invention is of particular advantage in manufacturing Peltier refrigerating arrangements, which comprise a plurality of Peltier elements.

The method according to the invention will now be explained with reference to an embodiment shown in the drawing.

Figure 2:
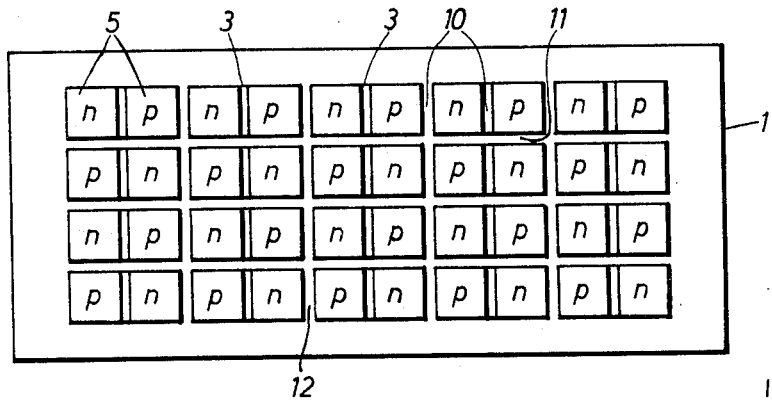
Figure 3:
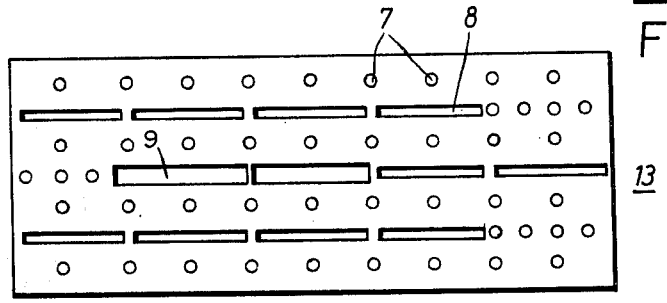
Figure 4:
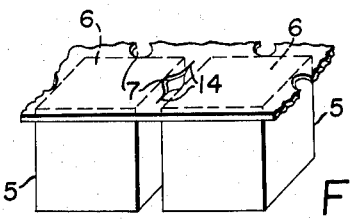

FIGURE 1 is a side elevation of a partly finished Peltier refrigerating arrangement, and
FIGURE 2 is a plan view thereof.
FIGURE 3 is a plan view of a foil of solder in accordance with the invention.
FIGURE 4 is a perpsective view of two semi-conductor bodies which are covered with a foil in accordance with the invention which is partly broken away, and
FIGURE 5 shows a semi-conductor body provided with a layer of solder.

In FIGURE 1 current bridges 3 of copper are adhered by layers of adhesive 2 to a base plate 1. The current bridges 3 form connections between semi-conductor bodies 5 of bismuth telluride of alternate p- and n-type which are secured to the bridges by layers of solder 4. As will be seen from the plan view of FIGURE 2, there are four rows of Peltier elements which each consist of semi-conductor bodies 5 of p- and n-type. Since, when the Peltier arrangement is further mounted, current bridges have also to be soldered to the upper surfaces 6 (FIGURE 1) so as to provide an electric series connection of the semi-conductor bodies, all the surfaces 6 have to be coated with a layer of solder, however, the solder is not allowed to establish electrically conductive connections between the individual semi-conductor bodies 5, because otherwise an electrical short-circuit may occur which renders the arrangement unserviceable. In order to provide the said layers of solders, a foil 13 of solder of a thickness 0.2 mm. (FIGURE 3) is so arranged on the surfaces 6 that apertures 7 to 9 of the foil lie on gaps 10 to 12 (FIGURE 2). The apertures are made by punching. In FIGURE 2 only a few gaps and in FIGURE 3 only a few apertures are designated by reference numerals for the sake of clarity. The circular apertures 7 are smaller than the gaps 10 between the semi-conductor bodies 5, the dimensions of the apertures 8 correspond to the width of the gaps 11, and the apertures 9 are larger than the corresponding gaps 12.

When the foil has been arranged on the semi-conductor bodies 5 (FIGURE 4) the semi-conductor bodies and the foil are heated together. When the solder begins to melt it withdraws, starting from the apertures shown in FIGURE 4 as the circular apertures 7, to the surfaces 6 of the semi-conductor bodies 5 under the influence of the surface tension. This process is indicated in FIGURE 4 by the two pointed extensions 14.

Figure 5:
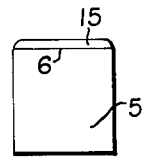

FIGURE 5 shows a finished semi-conductor body 5 provided with a layer of solder 15 which covers the surface 6.

In the embodiment described the surfaces 6 lie substantially in one plane. The method according to the invention, however, is not restricted to this case, but may also be used when the surface portions to be coated lie on a curved plane or when the material of the gaps projects above the surfaces to be coated. Furthermore the gaps not to be coated with solder may be formed by the application of layers of lacquer or the like.

The particular advantage of the method in accordance with the invention consists in that in mass manufacture of Peltier refrigerating arrangements many semi-conductor surfaces can be coated with solder in a simple operation without the risk that solder gives rise to electrical short-circuits by penetrating between the semi-conductor bodies.

What is claimed is:

1. A method of solder coating the end surface portions of an array of spaced semiconductive members while avoiding substantial solder penetration between the members, said end surface portions being separated from each other by a substance which is not wetted by the solder, comprising the steps of providing a coherent foil of solder having an array of apertures so related to the array of semiconductive members that, when the foil is positioned over the said end surface portions, an aperture exists over each space separating each of the end surface portions from all the others, placing the said solder foil in contact with the said end surface portions so that the apertures in the foil are substantially aligned with the spaces between the end surface portions, and heating the thus-formed assembly at a temperature at which the solder melts, whereby, as the solder begins to melt, the melt's surface tension causes the solder to withdraw, starting at the apertures in the foil, to the said contacted end surface portions without any substantial penetration thereof occurring between the members.

2. A method of solder coating the end surface portions of an array of spaced semiconductive members while avoiding substantial solder penetration between the members, said end surface portions being separated from each other by an empty gap, comprising the steps of providing a single coherent foil of solder having an array of apertures so related to the array of semiconductive members that, when the foil is positioned over the said end surface portions, an aperture exists over each gap separating each of the end surface portions from all the others, placing the said solder foil in contact with the said end surface portions so that the apertures in the foil are substantially aligned with the gaps between the end surface portions, and heating the thus-formed assembly at a temperature at which the solder melts, whereby, as the solder begins to melt, the melt's surface tension causes the solder to withdraw, starting at the apertures in the foil, to the said contacted end surface portions without any substantial penetration thereof occurring between the members.

3. A method as set forth in claim 2 wherein the semiconductive members are arranged vertically, and the solder foil is placed on top of the array.

4. A method as set forth in claim 2 wherein the members are of bismuth telluride.

References Cited by the Examiner
UNITED STATES PATENTS

| | | | |
|---|---|---|---|
| 1,996,657 | 4/1935 | Shannon | 148—6 |
| 2,282,123 | 5/1942 | Essig | 117—210 |
| 3,030,703 | 4/1962 | Wirsing | 29—471.1 |
| 3,080,261 | 3/1963 | Fritts et al. | 117—212 |
| 3,097,959 | 7/1963 | Zachman | 117—43 |

JOSEPH REBOLD, *Primary Examiner.*

JOSEPH B. SPENCER, W. L. JARVIS,
*Assistant Examiners.*